US011010673B2

(12) United States Patent
Chougule et al.

(10) Patent No.: US 11,010,673 B2
(45) Date of Patent: May 18, 2021

(54) METHOD AND SYSTEM FOR ENTITY RELATIONSHIP MODEL GENERATION

(71) Applicant: Tata Consultancy Serivces Limited, Mumbai (IN)

(72) Inventors: Sandeep Chougule, Pune (IN); Anil Kumar Kurmi, Pune (IN); Harrick Mayank Vin, Pune (IN); Rahul Ramesh Kelkar, Pune (IN); Sharmishtha Prakash Kulkarni, Pune (IN); Amrish Shashikant Pathak, Pune (IN); Girish Keshav Palshikar, Pune (IN); Sachin Pawar, Pune (IN); Nitin Vijaykumar Ramrakhiyani, Pune (IN)

(73) Assignee: Tata Consultancy Limited Services, Mumbai (IN)

( * ) Notice: Subject to any disclaimer, the term of this patent is extended or adjusted under 35 U.S.C. 154(b) by 601 days.

(21) Appl. No.: 15/224,931

(22) Filed: Aug. 1, 2016

(65) Prior Publication Data

US 2017/0032249 A1 Feb. 2, 2017

(30) Foreign Application Priority Data

Jul. 30, 2015 (IN) .......................... 2891/MUM/2015

(51) Int. Cl.
*G06N 5/02* (2006.01)
*G06N 20/00* (2019.01)
*G06F 16/28* (2019.01)

(52) U.S. Cl.
CPC ............ *G06N 5/02* (2013.01); *G06F 16/288* (2019.01); *G06N 20/00* (2019.01)

(58) Field of Classification Search
CPC .... G06F 16/254; G06F 16/258; G06F 16/285; G06F 16/288; G06F 16/325;
(Continued)

(56) References Cited

U.S. PATENT DOCUMENTS 5,383,120 A * 1/1995 Zernik ................. G06F 17/274
704/10
7,606,782 B2 10/2009 Haley
(Continued)

OTHER PUBLICATIONS

Wei Chen, "Developing a Framework for Geographic Question Answering Systems Using GIS, Natural Language Processing, Machine Learning, and Ontologies" Ohio State University 2014 (Year: 2014).*

(Continued)

*Primary Examiner* — Baboucarr Faal
*Assistant Examiner* — Van C Mang
(74) *Attorney, Agent, or Firm* — Finnegan, Henderson, Farabow, Garrett & Dunner

(57) ABSTRACT

System and method for automatic entity relationship (ER) model generation for services as software is disclosed. ER model generation by automated knowledge acquisition is disclosed, and automation of knowledge generation process is disclosed. Information extraction process is automated and multilevel validation of information extraction process is provided. System comprises training module to train information extraction model, and knowledge generation module for population of ER model. Standard Operators are generated based on the ER model so generated (populated). Context aware entity extraction is implemented for the ER model generation. System and method leverages existing ER model to make the system self-learning and intelligent, and provides common platform for knowledge generation from different data sources comprising documents, database, website, web corpus, and blog.

16 Claims, 7 Drawing Sheets

(58) Field of Classification Search
CPC ...... G06F 16/355; G06F 17/27; G06F 16/358;
G06F 16/34; G06F 16/338; G06Q 10/102
See application file for complete search history.

(56) References Cited

U.S. PATENT DOCUMENTS

| | | | | |
|---|---|---|---|---|
| 8,108,338 B2* | 1/2012 | Castro | ................. | G06F 16/27 707/610 |
| 8,346,795 B2* | 1/2013 | Roulland | ............. | G06F 16/285 707/766 |
| 8,504,490 B2* | 8/2013 | Nie | ..................... | G06Q 10/10 706/12 |
| 8,938,410 B2* | 1/2015 | Cafarella | ............... | G06Q 10/02 706/20 |
| 9,519,695 B2* | 12/2016 | Sampathkumaran | ....................... | G06F 16/254 |
| 2003/0055625 A1* | 3/2003 | Korelsky | ............ | G06F 17/2755 704/9 |
| 2008/0097968 A1* | 4/2008 | Delgado | ................. | G06F 16/36 |
| 2009/0063559 A1* | 3/2009 | Rhodes | ................. | G06F 16/288 |
| 2011/0191276 A1* | 8/2011 | Cafarella | ............... | G06Q 10/02 706/12 |

OTHER PUBLICATIONS

Maes "Evaluating quality of conceptual modelling scripts based on user perceptions" Ghent University, Tweekerkenstraat (Year: 2007).*
Jing, Knowledge-based vector space model for text clustering, Springer-Verlag london, 2009 (Year: 2009).*
Callan, "Knowledge-Based Extraction of Named Entities", pp. 532-537 (Year: 2002).*
Collobert, "A Unified Architecture for Natural Language Processing: Deep Neural Networks with Multitask Learning", 2008 (Year: 2008).*

* cited by examiner

METHOD AND SYSTEM FOR ENTITY RELATIONSHIP MODEL GENERATION

CROSS-REFERENCE TO RELATED APPLICATIONS AND PRIORITY

The present application claims priority from Indian provisional specification no. 2891/MUM/2015 filed on 30 Jul. 2015, the complete disclosure of which, in its entirety is herein incorporated by references

TECHNICAL FIELD

The embodiments herein generally relate to knowledge acquisition and modeling, and more particularly to automatic entity relationship (ER) model generation for services as software.

BACKGROUND

Conventionally, organizations mainly depend on human resources for knowledge acquisition, knowledge sharing and further application of the knowledge in many ways. In service and support industries, enormous amount of knowledge is available with human resources mostly in tacit form, and also in software systems in documentation form. The knowledge available with the human resources and the software systems is utilized for analysis and resolution of problems arising in day to day service and support work. However, the knowledge available with the human resources and the software systems needs to be converted into structured, complete and reusable form.

However, knowledge capturing through crowd sourcing exposes the organization to a potential risk of non-uniformity in the knowledge captured for similar technologies. The non-uniformity of the knowledge so captured further results in secondary problems such as difficulty in abstracting the knowledge for similar technologies.

Prior art systems as mentioned in one of the previous patent application "Titled System and method for service modelling" filed in the Indian patent office with application number 3242/MUM/2013 are generating Entity Relationship (ER) models by means of a user interface in order to make ER formation very interactive with simple drag and drop feature of Diagram Editor. However, the prior art systems are suffering with drawbacks of human errors and lack of intelligence, and also require considerably more human efforts. Further, these prior systems are also unable to leverage existing knowledge while generating the ER models.

SUMMARY OF THE INVENTION

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, according to an embodiment, a system and method for automatic entity relationship (ER) model generation for services as software is disclosed. The system comprises a user interface, a memory and a processor. The user interface provides a plurality of documents as a first input and an existing entity relationship model as a second input. The processor is in communication with the memory. The processor comprises a training module, a validation module, an extraction module and a knowledge generation module. The training module trains an information extraction model using the first input and the second input. The validation module validates the trained information extraction model. The extraction module extracts one or more features from the data source using the trained information extraction model. The knowledge generation module generates the entity relationship model using a set pattern based on one or more extracted features.

In another embodiment, the system and method for Entity Relationship (ER) model generation by automated knowledge acquisition is disclosed. The system and method more particularly automates the knowledge generation process.

In one aspect, the system and method automates an information extraction process and provides a multilevel validation of the information extraction process and extracted information.

In another aspect, the system and method provides a training module to train an information extraction model, and a knowledge generation module for population of an ER model for services as software. The services may be infrastructure services, business process services, enterprise services and the like. By executing ER generation process, the system automatically extracts relevant information from different data sources. Further, by using the extracted relevant information, a plurality of ER models are generated using a context aware system. Based on the ER model and the extracted information further, the system and method implements generation of Standard Operator implementations. Standard operators and structure is contained in the knowledge model in the following prior art reference—"Titled System and method for service modelling" filed in the Indian patent office with application number 3242/MUM/2013.

In another embodiment, a non-transitory computer-readable medium having embodied thereon a computer program for generating an entity relationship model. Initially a plurality of documents are received by the processor as a first input and an existing entity relationship model are received by the processor as a second input. In the next step, an information extraction model is trained using the first input and the second input using a training module. In the next step the trained information extraction model is validated. A data source is then provided as input to a knowledge generation module. In the next step, one or more features are extracted from the data source using the trained information extraction model. A pattern is then set based on one or more extracted features. And finally the entity relationship model corresponding to the data source is generated based on the set pattern using the knowledge generation module.

In another aspect, the system and method leverages an existing ER model to make the system (information extraction model) more intelligent.

Further, the system and method provides a common platform for extracting knowledge from heterogeneous data sources.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF THE INVENTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Glossary—Terms Used in the Embodiments with Explanation

Service Catalogue is a catalogue of service operations for managing a technology/Business layer. (Resolving incidents or fulfilling service/change requests). By way of an Example—Oracle Management, Windows Management, Web Application Management, Bank Account Management, Credit Card Management can be the service catalogue.

Service Operation—Service Operation is a composition of standard operators and service operations in a workflow. Examples of service operations may be—Create OS User, Create OS Group, Add User to Group, Change Bank Account details, Request for a credit card pin, Request for debit card and the like.

Standard Operators—Atomic functions that represent single actions of a technology instance. Examples of Standard Operators may be—Check User, Create Group in OS, Change Bank Account address and the like.

Verb—Verb is the action to be performed on the one or more entities.

Information extraction (IE): Information extraction is a task of automatically extracting structured information from unstructured and/or semi-structured machine-readable documents.

Feature Extraction: Feature extraction starts from an initial set of measured data and builds derived values (features) intended to be informative, non-redundant, facilitating the subsequent learning and generalization steps, in some cases leading to better human interpretations.

IE Features Management: IE Features Management stores, updates and retrieves features.

System Recommendation: System Recommendations typically produce a list of pre-marked recommendations for users.

WordNet: WordNet is a lexical database for the English language. WordNet is used to build ontology.

VerbNet: VerbNet is similar as WordNet. VerbNet is a lexical database for the English language. VerbNet is used to build ontology.

ConceptNet: ConceptNet or Concept Taxonomy is a knowledge for Analogy Detection to build domain lexicon.

Lexical DB: Lexical DB is a database used to store information about lexicon.

Figure 1:
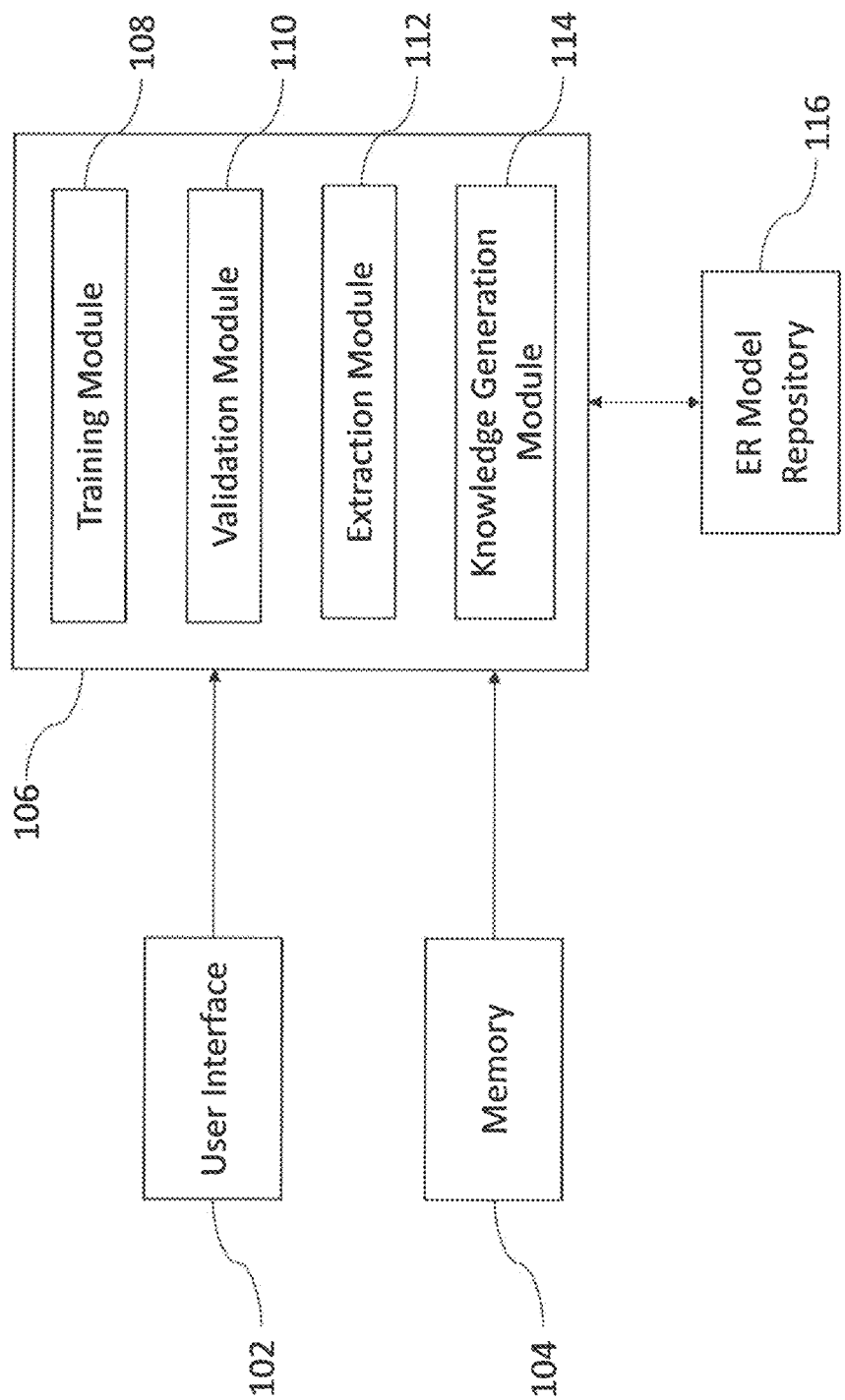
FIG. 1 illustrates a system 100 for an Entity Relationship (ER) model generation, in accordance with an embodiment of the present disclosure.

Referring now to the drawings, and more particularly to FIG. 1, where similar reference characters denote corresponding features consistently throughout the figures, there are shown preferred embodiments and these embodiments are described in the context of the following exemplary system and/or method.

FIG. 1 illustrates a schematic block diagram of a system 100 for generation of an entity relationship (ER) model according to an embodiment of the disclosure. In view of the foregoing, according to an embodiment, the system and method for automatic entity relationship (ER) model generation for services as software is disclosed. The services may be infrastructure services, business process services, enterprise services and the like. The system and method more particularly automates the knowledge generation process. For automation of services, while automatically generating entity relationship (ER) model, the system and method may automate an information extraction process, and may provide a multilevel validation of the information extraction process and extracted information as well.

In another embodiment, the system and method automates an information extraction process and provides a multilevel validation of the information extraction process and extracted information. Further, the system and method provides a training module to train the system, and a knowledge generation module for population of the ER model.

According to another embodiment, the system and method for automatic pattern generation from user annotated data is disclosed. The system and method also learns from existing ER model to improve the system recall. There are shown preferred embodiments and these embodiments are described in the context of the following exemplary system and method.

The system 100 comprises a user interface 102, a memory 104 and a processor 106 in communication with the memory 104 as shown in FIG. 1 according to an embodiment of the disclosure. The processor 106 further comprises a plurality of modules for performing various functions. The plurality of modules are configured to fetch the algorithm stored in the memory 104 and perform any particular function. The plurality of module further comprises a training module 108, a validation module 110, an extraction module 112 and a knowledge generation module 114.

Figure 3:
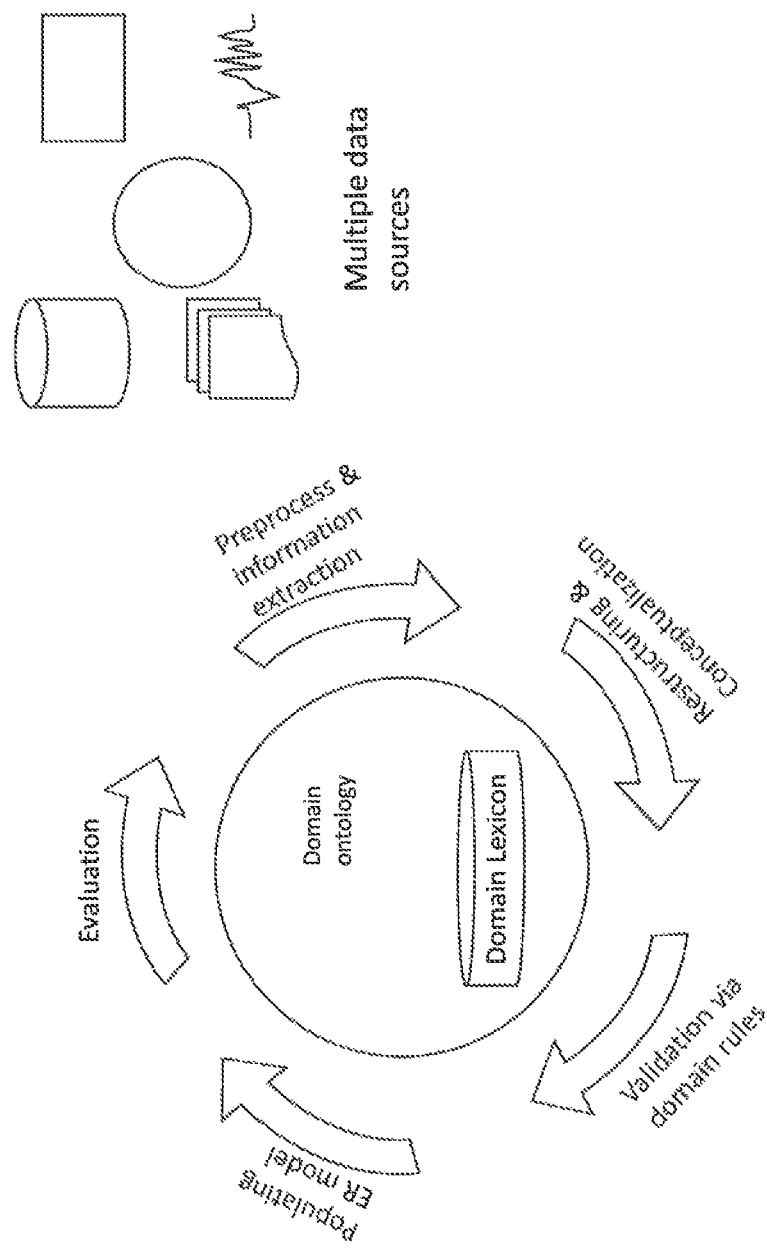
FIG. 3 illustrates a method of automated knowledge acquisition for the entity relationship (ER) model generation, in accordance with an embodiment of the present disclosure.

According to an embodiment of the disclosure, the user interface 102 is configured to provide a plurality of documents as a first input and an existing entity relationship model as a second input. The plurality of documents may comprise user manual, technical manuals, standard operational procedures, and the like. The plurality of documents can be received from multiple data sources. The data source may be a document, a website, a database, a blog, stack overflow (web corpus), images, pictures, sound or any other type of data source known to a person skilled in the art. It should be appreciated that, the system and method provides a framework to convert the first input and the second input from multiple data sources to a structured format of knowledge as shown in FIG. 3.

According to an embodiment, in order to automate a knowledge generation process, the training module 108 may be used to train an information extraction model using the first input and the second input. The data sources provided as the first input and the second input, may be further processed by the training module 108.

Figure 4:
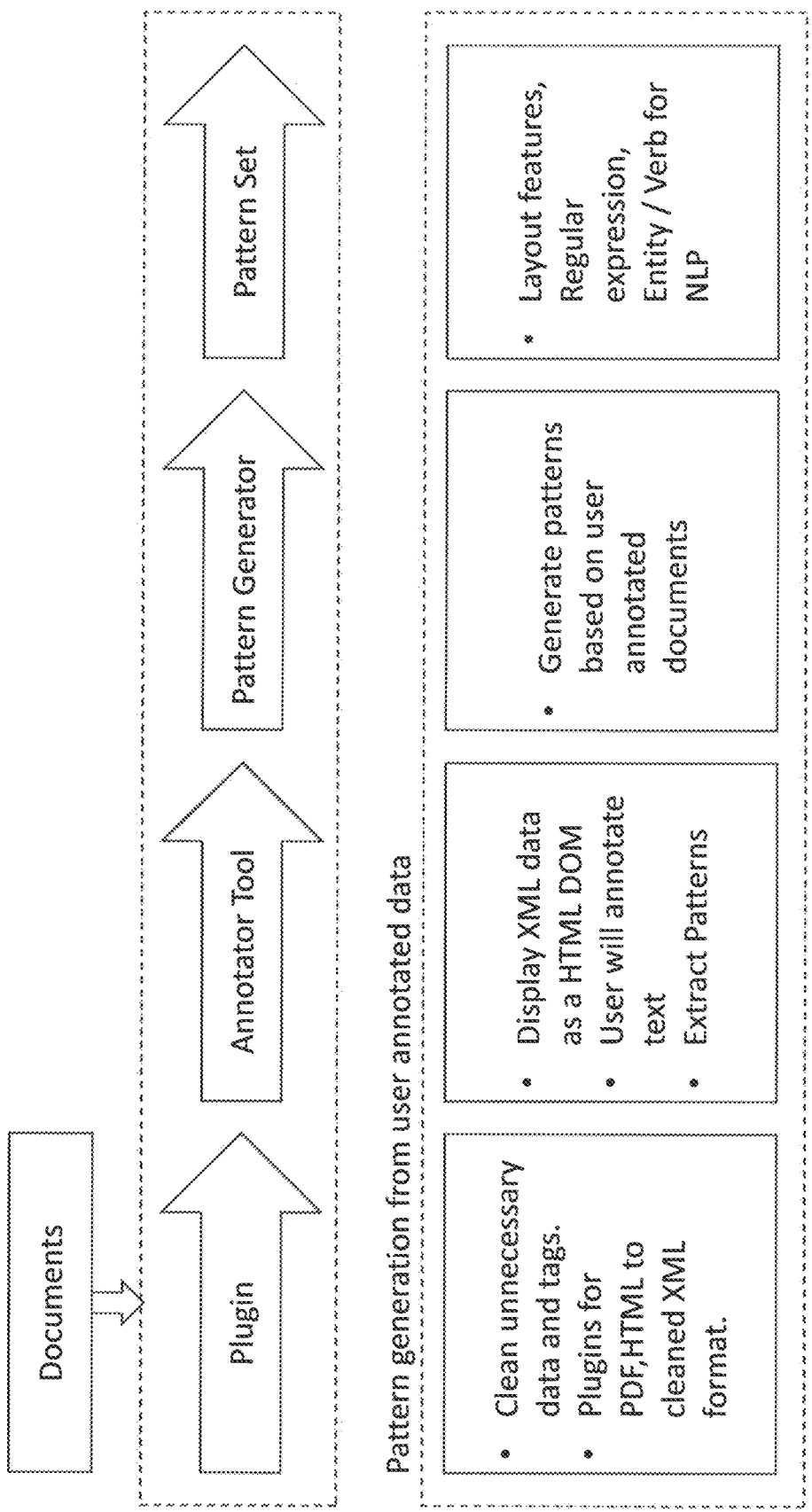
FIG. 4 illustrates a training module execution flow diagram, in accordance with an embodiment of the present disclosure.

Referring to FIG. 4, the training module 108 may pre-process the data available in the data source to convert into structured format. In one embodiment, the information extraction model may be trained to extract one or more features from manually annotated data from the one or more data sources. In another embodiment, the information extraction model may be trained to extract the one or more features from manually annotated data from an information source and existing one or more Entity Relationship models (ER model) if any available. In another embodiment, annotation of the text may be performed automatically using learned pattern set and ontology.

Figure 2:
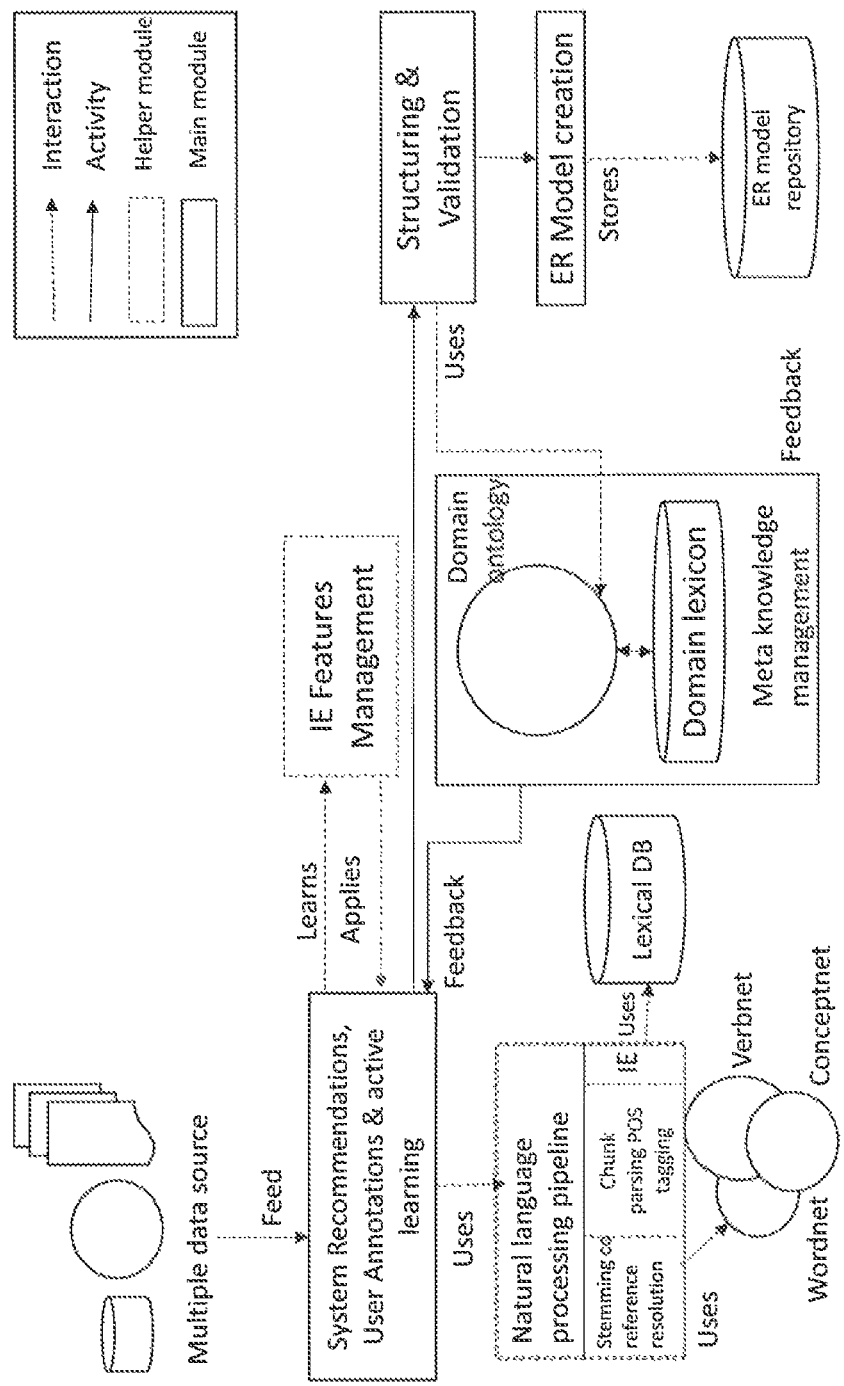
FIG. 2 illustrates a framework and a method to convert information from multiple data sources to a structured format of knowledge, in accordance with an embodiment of the present disclosure.

As show in FIG. 2 the information extraction model may use at least one of Natural Language Processing pipeline tools to perform stemming, co-reference resolution, chunk parsing and part of speech tagging. Further, in order to perform the above said Natural Language Processing pipeline tools, the training module 108 may use standard knowledge such as word-net, verb-net, concept-net, lexical-DB and the like.

Based on the underneath information feed(s), the information extraction model may be trained to learn a plurality of features from the annotated text and store the plurality of features for further use. Further, based on the underneath information feed(s), the information extraction model may be trained to apply pre-learned and stored features appropriate for the information feeds to select/set a pattern.

Referring to FIGS. 2 and 3, the system further comprises the validation module 110, enabled to perform automatic restructuring and validation on the information so extracted. Automatic restructuring and validation may be performed using existing meta-knowledge like ontological entity relations, key phrases, noun-verb pairs and domain lexicons and the like. Thus the training module 108 trains the information extraction model for information extraction and validation module 110 validates the trained information extraction model in a structured manner and to select the pattern from the data source. As shown in FIG. 2, domain lexicons may be stored in a domain lexicon repository. Domain ontology and domain lexicon repository may be retrieved from the existing knowledge in the system. The existing knowledge in the system may comprise knowledge residing in the ER models, WordNet, VerbNet, existing ontologies stored, and the like.

The system may use manually coded set of rules and predicates to validate the generated knowledge in first cycle. Once First level of knowledge is generated, the first level of knowledge can be used as a validation rule for new knowledge to check the validity of generated knowledge. Annotation tool also have marking and unmarking options to correct the marked text to increase the system accuracy and the features of the marked text may be stored as a positive or negative pattern depending upon marking or unmarking action performed by the user. The pattern can be set of multiple features, there can also be more than one such sets available. The pattern set comprises one or more patterns. In this active learning process, the system iterates to learn new features and update existing features.

In another embodiment, the information extraction model may be trained to extract a different type of information from the data source. The different type of information may comprise one or more entities, verbs, attributes, conditions and the like. The information extraction model extract the features for the one or more entities, the verbs, the attributes, the conditions and the like based on the annotated text. In another embodiment, the information extraction model extract the features for the one or more entities, the verbs, the attributes, the conditions, the relationship between the one or more entities and the attributes of the one or more entities, and the like based on the selection of the user. At a time, the information extraction model may extract the features for at least one of entity, verb, attribute, condition, the relationship and the like.

The information extraction model may automatically extract the Entity-Entity relation key phrases and Noun-Verb pairs from the data source (may be along with confidence-score). The information extraction model may analyse extracted information by comparing the extracted information with continuously evolving existing meta-knowledge containing domain ontology and domain lexicon. The extracted information may be presented to the user as system recommendations for annotation.

The annotation process by the user may be iterative and the annotation process is a part of active learning for feature generation further for knowledge acquisition. The features may comprise regular expressions, part of speech tags, input data representation structures, ontological entity relations, key phrases, noun-verb pairs and the like.

Referring to FIG. 4, the working of the training module 108, by way of an example is illustrated. In the first phase, termed as Plugin Phase, the training module 108 cleans unnecessary data and tags from a document. In one example, text data contained in the document is converted into structured format, exemplary XML format and the like from a PDF, a HTML format and the like.

After Plugin Phase, as illustrated in FIG. 4, in an Annotator Tool Phase, the data from the document is converted into structured format, for example the XML data from the document is displayed in structured format. In one example, the structured format is a HTML DOM format. The HTML DOM format may be annotated automatically or manually. Further, after annotation, in Pattern Generator Phase, one or more features are extracted from the annotated HTML DOM format document to select/set a pattern. The one or more features comprise regular expressions. Based on user annotated text, system generate a pattern. The pattern is selected from the one or more features. By way of an example, one of the pattern is structure based which are CSS, style, HTML tag, or a font size in case of HTML document. Similar type of features exists in PDF or other type of documents as well. Another type of pattern is a regular expression which is used to look for various other patterns in documents and follow certain structure like command have certain pattern e.g. start with $ sign, have some attributes, predefined structured and the like. Another type of pattern is POS tagging feature which may try to identify nouns and verbs in the text. For example, User is a noun, create is a verb and the like. Further, a pattern is used for ontology learning between different entities, verbs, attributes, conditions and the like. From pattern ER model is learnt, and further from ER model and other existing knowledge from system, the ontology is learnt.

For example, User belongs to a Group, User have access on a File System and the like. Further in another embodiment, the entity extraction as referred in the annotator tool phase may be a context aware entity extraction. The context aware Entity, Verb, Attributes and Conditions extraction is required in order to understand meaning of the Entity, the Verb, the Attributes, the Conditions and the like correctly. Some verbs or entities have multiple meaning, whereas in some cases multiple verbs have same meaning. Presently disclosed training module 108 considers context aware phrases.

After pattern generator phase, as illustrated in FIG. 4, the pattern may be set or selected. In another embodiment, the pattern may be negative pattern that is a pattern set not to select/ignore particular features from the text. The one or more patterns may be set as one or more layout features, trait features, one or more regular expression, one or more Noun Phrase, one or more Verb Phrase and the like for information extraction.

According to an embodiment, referring to FIG. 1, the system may further comprise the extraction module 112 and the knowledge generation module 114. Once the information extraction model is trained, based on the information extraction model so trained, the extraction module 112 may extract the one or more features from the data source using the trained information extraction model. Further based on the one or more features so extracted, a pattern may be selected/set for the particular information type from the data source. Using this set pattern the knowledge generation module 114 generates the entity relationship (ER) model. The information type may be selected from the one or more entities, the verbs, the attributes, the conditions and the like. On the underneath information feed(s), the information extraction may be performed by using appropriate features for corresponding information type.

The existing ER model data may also be used to populate the ER model. The ER models so generated may be stored in an ER model repository 116 as shown in FIGS. 1 and 2. Further, knowledge stored in the ER model repository 116 may be used as a feedback for generating new ER models. The system 100 is also configured to update the ontology in the entity relationship model repository. It should be appreciated that in another embodiment the system 100 may also provide an approach to calculate a confidence score.

The disclosure provides a multiple ways to estimate any ER element. Each of these multiple ways can be associated with the confidence score or confidence logic. These confidence logics can be cumulatively analyzed to generate the confidence score. For example, for user annotations the confidence score will rise as one way, the other might be existing ER models of similar technologies. Multiple occurrences of an ER element will also increase the confidence score. Also the ER elements have references/relations with other elements in one or more documents from the corpus and based on their relationships, association confidence score could be computed. The graph co-ranking approach can also be used in the calculation of the confidence score. The graph co ranking involves arrangement of the candidate relations and candidate entities in a bipartite graph and an iterative step to assign scores. Each way mechanism which leads to the determination of an ER element, should add corresponding confidence associated with the mechanism.

In another embodiment, the ER model may be enhanced based on the existing one or more ER models. Further, the ER model may be used for one or more standard operator implementation generation and updation of the new ER models. The ER model so generated may also be used for updation of the existing standard operator implementation.

Figure 5:
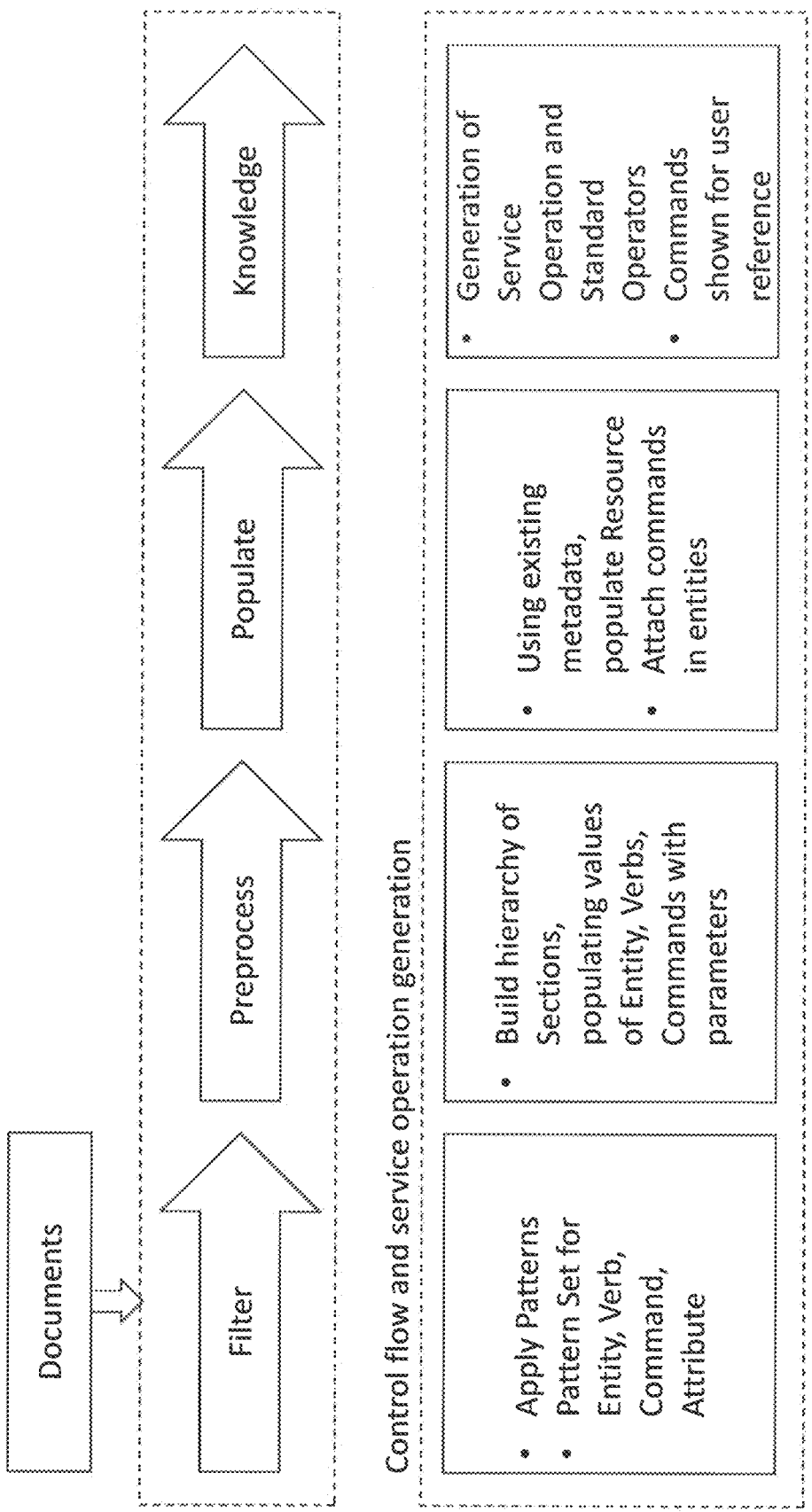
FIG. 5 illustrates a knowledge generation module execution flow diagram, in accordance with an embodiment of the present disclosure.

It should be appreciated that in an embodiment of the disclosure, there could be single ER model if it's of the same technology. In another embodiment there could be multiple ER models of similar technologies and/or an abstract ER model of the base type of technology. For example for Oracle technology or MySQL, abstract ER model of Database can be provided. For Windows technology, abstract ER model of Operating Service can be provided. By referring another similar technology knowledge, an ER model recommendations can be generated by using the transfer learning technique. This concept is called as the transfer learning, i.e., a research problem that focuses on storing knowledge gained while solving one problem and applying it to a different but related problem According to an embodiment of the disclosure, as illustrated in FIG. 5, execution flow of the knowledge generation module is described. At least one of structured documents or one or more data sources, metadata dictionary and one or more patterns may be provided as an input to the knowledge generation module 114. In the first phase, a Filter Phase, selected/set pattern may be applied to the data source. The data source may be a document, a database, a website, a blog, a web corpus and the like. The pattern may be selected by the user or the information extraction model. The patterns may be set for different information types such as an Entity, a Verb, a Command attribute, a Condition and the like. At a time only one type of information may be selected.

After Filter phase, as illustrated in FIG. 5, in Preprocess phase, hierarchy of one or more sections of the data source may be built and values of the Entities, Verbs, and Commands may be populated with parameters. The entities so generated may go through multi-level validation so as to increase the efficiency of the system. Different one or more entities, one or more verbs, one or more attributes, one or more conditions, relationship between the entities and attributes and the like associated with the ER model are generated by applying pattern set on the data source. The pattern set may comprise one or more patterns. The one or more entities, one or more verbs, one or more attributes, one or more conditions, the relationships and the like so generated may be validated by ontological data and constraints. The ontological data and the constraints may be based on rules, wherein the rules may be standard rules (domain rules), the standard rules may be updated on incremental basis. Further, the standard rules may require manual review and writing of the rules. The rules may be domain rules.

After Preprocess Phase, as illustrated in FIG. 5, in Populate Phase, one or more ER models may be populated using existing metadata, one or more entities, one or more attributes of the entities, one or more verbs, one or more conditions and one or more commands so attached in the entities. The one or more ER models so populated comprise knowledge so extracted from the data source. Further, commands may be analyzed based upon the attributes associated with the commands. Key attributes, and entity may be identified. Commands may be recommended to be part of verb pertaining to entity, association or attribute. User may validate the commands.

In another embodiment of the present disclosure, the system and method may further comprise generation of implementations for standard operators based upon commands, and generation of the implementations may be semi-automatic or fully automatic.

Figure 6:
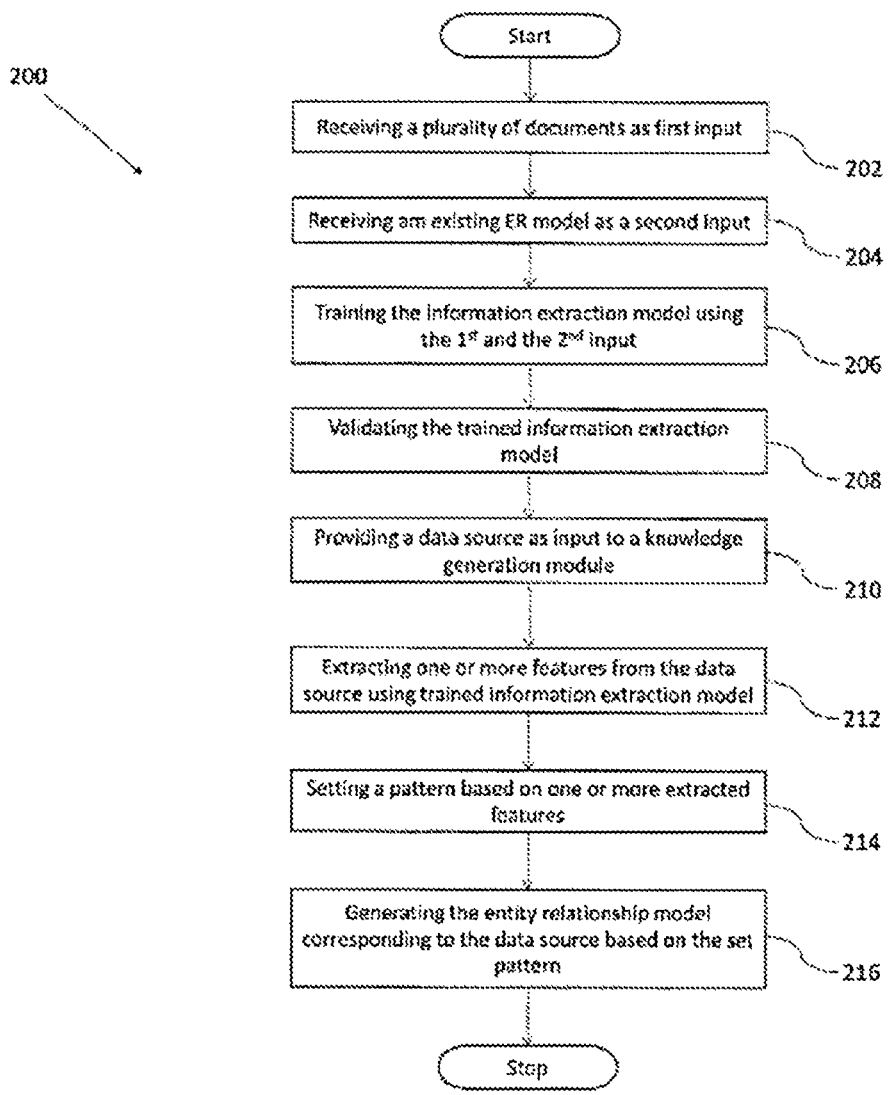
FIG. 6 illustrates a flowchart for generating an Entity Relationship model in accordance with an embodiment of the present disclosure.

In operation, a flowchart 200 illustrating a method for generating entity relationship model is shown in FIG. 6 according to an embodiment of the present disclosure. Initially at step 202, the plurality of documents are received by the processor 106 as the first input. The plurality of documents may comprise user manual, technical manuals, standard operational procedures, and the like. At step 204, the processor also receive the existing entity relationship model as the second input. It should be appreciated that the processor 106 may also receive the data from more than one existing ER models.

At the next step 206, the information extraction model is trained using the first input and the second input by the training module 108. The training module 108 also configured to preprocess the data available in the data source to convert into structured format. At step 208, the trained information extraction model is then validates using the validation module 110. At step 210, a data source is provided as input to a knowledge generation module 114. At step 212, the one or more features are extracted from the data source using the trained information extraction model and the knowledge generation module 114. In the next step 214, a pattern is set based on one or more extracted features. And finally at step 216, the entity relationship model is generated corresponding to the data source based on the set pattern using the knowledge generation module 114.

According to another embodiment of the disclosure, the plurality of entities and their relations can be extracted from user manuals using two techniques—Noun Verb Collocation based and Dependency based. Both approaches require a list of action verbs as input. In the Noun Verb Collocation based approach, all the noun phrases which occur in the neighborhood of any action verb are extracted. A noun phrase is said to be in the neighborhood of any verb if there is no other verb/noun in between them. In an example, the approach for extracting relations is based on the ReVerb system as described in the research paper by Fader, Anthony, Stephen Soderland, and Oren Etzioni Titled "Identifying relations for open information extraction" published in Proceedings of the Conference on Empirical Methods in Natural Language Processing. Association for Computational Linguistics, 2011. ReVerb is an Open Information Extraction system, where tuples of the form <Entity1, Relation, Entity2> are extracted. It follows a "relations first" approach where relation strings are first identified using some rules and nearest noun phrases to the left and right of the relation string are extracted as the two entity arguments. Here, relation is constrained to be any one of the following:
1. Only a verb (e.g. <firefox, opens, pop-up window>)
2. A verb followed by a preposition (e.g. <photo, stored on, computer>)
3. A verb followed by any number of nouns, adjectives, determiners and adverbs, followed by a preposition (e.g. <vlc medium player, capture video from, webcam>)

Regular expressions over POS-tagged text are designed to extract relation strings and corresponding entities as per the above description.

According to another embodiment of the disclosure, the Dependency based approach starts with a list of action verbs and nouns that are in a dependency relation with the action verbs are extracted. It was considered that the noun phrase for extraction if the dependency relation is any of the following—nsubj (active voice—noun subject), nsubjpass (passive voice—noun subject), dobj (direct object) or iobj (indirect object).

To extract relations, the approach is extended to extract tuples with two nouns and an action verb connected through two dependency relations. The extracted tuples hence relate two entities with a connecting action. For example: <window, displays, email>, <toolbar, display, option>, etc. Additionally tuples are also extracted where a noun occurs as an object (direct or indirect) of an action verb. In such extractions it was assumed that the presence of an implicit subject which is the user or the pronoun "you". For example: <IMPLICIT_SUBJ, add, contact>, <IMPLICIT_SUBJ, transfer, music>, etc.

The two approaches can be explained with the help of following sentence as an example: "If you purchased content on Google Play in the past, you'll automatically have access to this content on any Android device". The two baseline techniques report the extractions as shown in Table 1.

| Noun verb collocation based technique | | Dependency based technique | |
| --- | --- | --- | --- |
| Entities | Relations | Entites | Relations |
| you | <you, purchased, content> | you | <you, purchased, content> |
| content | | content | |
| access | <you, purchased, content on, google play> | access | |
| Google Play | | Google Play | |
| | | Android device | |

Further, according to an embodiment of the disclosure, the system may also provide enhancements over the basic ReVerb system as mentioned above. The above mentioned two approaches also extract Multi-arity relations in addition to the binary relations, i.e. relations connecting more than two entities at a time. For example, in the sentence "The view is created by the user in the default tablespace", the relation create connects three entities user, view and default tablespace.

According to another embodiment of the disclosure, the above mentioned techniques also extract the relations which are expressed as a conjunction of two verbs. For example, in the sentence "You can enable or disable automatic file extension", the relation is captured as enable or disable with entities you and automatic file extension.

According to yet another embodiment of the disclosure, the above mentioned techniques also extract the negative relations. These techniques extract relations expressed as verbs modified by negative adverbs like not and never. For example, in the sentence "You cannot create an object in a read-only tablespace", the relation is captured as "not create". As these techniques treat each verb as a relation and each noun phrase as an entity, but this may be not be true always. As an instance the noun "example" is not an entity and similarly the verb "possess" is also not a relation. Hence, another technique was proposed where all verbs are considered as "candidate relations" and all noun phrases are considered as "candidate entities" and through a scoring mechanism they are ranked for being valid entities and relations. This technique is based on graph co-ranking and involves arrangement of the candidate relations and candidate entities in a bipartite graph and an iterative step to assign scores. The intuition behind this approach is that verbs which are more likely to be valid "relations" are connected to the noun phrases which are more likely to be valid "entities".

Figure 7:
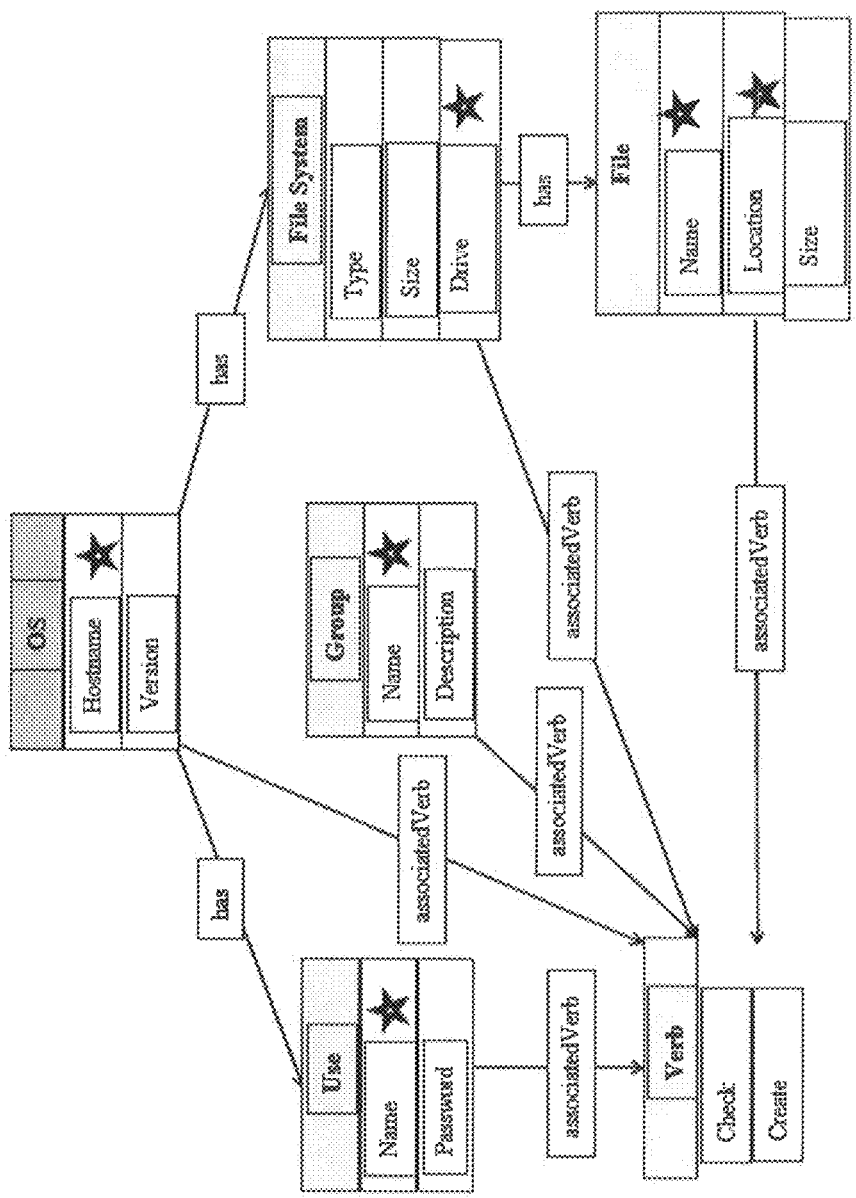
FIG. 7 illustrates the Entity Relationship model in accordance with an embodiment of the present disclosure.

Referring to FIG. 7 an exemplary ER model so generated in the Populate Phase is shown. The ER model comprises various entities. Referring to FIG. 7, the entities comprises operating system (OS), one or more users, one or more groups and one or more File-System. The ER model further comprises sub-entities such as File and Verb.

According to an embodiment of the disclosure, the system 100 can also be explained with the help of an example as shown in FIG. 7, "☆" represents the key attribute with respect to each entity. Wherein the key attribute is automatically detected but is subject to review and change as per the user preference.

Referring further to FIG. 7, Hostname and Version are attributes of OS, and Hostname is the key attribute. Name and Password are the attributes of User and Name is the key attribute. Name and Description are the attributes of Group and key attribute is Name. Type, Size and Drive are the attributes of File-System and Drive is the key attribute. Name, Location and Size are the attributes of File. Name and Location are the key attributes. Check and Create are Verbs which can be performed on OS, User, Group, File-System and File.

Referring to FIGS. 2 and 3, more specifically in the Knowledge Phase, one or more Service Operations and Standard Operators may be generated by using the ER model so generated and the metadata, based on the one or more commands. The one or more commands may be shown for reference to a user.

In another embodiment the one or more Service Operators and one or more Service Operations generated in the Knowledge Generation module may be further used for new Entity Relationship model generation. Further, the system also validates at least one of the entities, attributes, verbs, commands, conditions and the like, so generated for different documents, which is the input for ER modelling. The system also provides a very simple user interface to train the system and able to generate the features for information extraction. These features are essential to generate new entities for new documents. The system and method considerably reduces the efforts and time required for generation of the ER model. The ER model so generated is more accurate and complete over the ER models generated by using prior art techniques. The accuracy for generation of ER model is improved by providing the multi-level validation for entity generation. The system is self-learning and intelligent system which can learn from the system's own experience. Hence, amount of data processing required is reduced.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for automatic generation of an entity relationship model, the method comprising a processor implemented steps of:
   receiving, by an extraction module coupled with the processor, a plurality of documents as a first input;
   receiving, by the extraction module coupled with the processor, an existing entity relationship model as a second input;
   training, by a training module coupled with the processor, an information extraction model using the first input and the second input from one or more data sources to generate a first level of knowledge and a second level of knowledge;
   validating, by a validation module coupled with the processor, the trained information extraction model by using an existing meta-knowledge and performing automatic restructuring, wherein the existing meta-knowledge includes ontological entity relations, key phrases, noun-verb pairs and domain lexicons;
   providing, by the processor, a data source as input to a knowledge generation module;
   extracting, by the processor, one or more features from the data source using the trained information extraction model, wherein the information extraction model is configured to perform stemming, co-reference resolution, chunk parsing and part of speech tagging using at least one of Natural Language Processing pipeline tools, wherein the training module configured to train the information extraction model to perform the steps of:
   converting, by the processor, the first input and second input into a structured format, wherein the structured format is annotated data,
      extracting one or more features from the annotated data, and
      generating patterns based on user annotated documents;
   setting, by the processor, a pattern using the generated patterns based on one or more extracted features, wherein the trained information extraction model applies pre-learned and stored features appropriate for information feeds to set the pattern; and
   generating, by a knowledge generation module coupled with the processor, the entity relationship model corresponding to the data source based on the set pattern using the knowledge generation module, wherein the entity relationship model is generated by building a relational hierarchy of the one or more features by populating values associated with the one or more features, wherein the generated entity relationship model is further validated using the generated first level of knowledge as a validation rule for a new knowledge.

2. The method of claim 1, wherein at least one of the plurality of documents are unannotated documents or partially annotated documents.

3. The method of claim 1, wherein the entities can be extracted using at least one of a noun verb collocation approach and a dependency based parsing.

4. The method of claim 3, wherein the noun verb collocation approach comprises the steps of: identifying all the possible entities in the plurality of documents; identifying all the entity relationships in the plurality of documents; and filtering to remove unwanted entities and unwanted entity relationships, wherein the filtering results in generation of positive and negative entities.

5. The method of claim 3, wherein the dependency based parsing comprises the steps of:
   identifying a list of action verbs;
   extracting a list of nouns that are in the dependency relation with the list of action verbs;
   extracting tuples with two nouns and an action verb connected through two dependency relations; and
   relating at least two entities of the extracted tuples with a connecting action.

6. The method of claim 1, wherein the one or more feature comprises one or more entities, one or more verbs, one or more attributes, one or more conditions or relationship between the entities and the attributes.

7. The method of claim 1 wherein the information extraction model extracts multi-arity relations, conjunctive relations or negative relations.

8. The method of claim 1, wherein the data source comprises at least one of documents, a database, a web site, a web page, a blog, a web corpus like stack-overflow, images, pictures or sounds.

9. The method of claim 6, wherein the documents comprise user manual, technical manuals or standard operational procedures.

10. The method of claim 1 further includes the step of storing the generated entity relationship model in an entity relationship model repository and updating an ontology in the entity relationship model repository.

11. The method of claim 10, wherein the ontology stored in the entity relationship model repository is used as a feedback for generating a new entity relationship model.

12. The method of claim 1 further include the step of transferring the learning of the ER model from one database to another database.

13. The method of claim 1 further includes the step of providing multi-level validation for improving the accuracy of entity relationship model generation.

14. A system for automatic generation of an entity relationship model, the system comprises:
   a user interface for providing a plurality of documents as a first input and an existing entity relationship model as a second input;
   a memory; and
   a processor in communication with the memory, wherein the processor is configured to execute the steps of:
   receiving a plurality of documents as a first input using an extraction module;
   receiving an existing entity relationship model as a second input using the extraction module;
   training an information extraction model using the first input and the second input from one or more data sources to generate a first level of knowledge and a second level of knowledge using a training module;
   validating the trained information extraction model by using an existing meta-knowledge and perform automatic restructuring, wherein the existing meta-knowledge includes ontological entity relations, key phrases, noun-verb pairs and domain lexicons using a validation module;
   extracting one or more features from the data source using the trained information extraction model, wherein the information extraction model is configured to perform stemming, co-reference resolution, chunk parsing and part of speech tagging using at least one of Natural Language Processing pipeline tools, wherein the training module configured to train the information extraction model to perform the steps of:
converting the first input and second input into a structured format, wherein the structured format is annotated data,
extracting one or more features from the annotated data,
generating patterns based on user annotated documents; and
setting a pattern using the generated patterns based on one or more extracted features, wherein the trained information extraction model applies pre-learned and stored features appropriate for information feeds to set the pattern; and
generating the entity relationship model using a set pattern based on one or more extracted features using a knowledge generation module, wherein the entity relationship model is generated by building a relational hierarchy of the one or more features by populating values associated with the one or more features, wherein the generated entity relationship model is further validated using the generated first level of knowledge as a validation rule for a new knowledge.

15. The system of claim 14, further includes an entity relationship model repository for storing the generated entity relationship model.

16. A non-transitory computer-readable medium having embodied thereon a computer program for automatic generation of an entity relationship model, the method comprising the steps of:
receiving, by an extraction module coupled with a processor, a plurality of documents as a first input;
receiving, by the extraction module coupled with the processor, an existing entity relationship model as a second input;
training, by a training module coupled with the processor, an information extraction model using the first input and the second input from one or more data sources using a training module to generate a first level of knowledge and a second level of knowledge;
validating, by a validation module coupled with the processor, the trained information extraction model by using an existing meta-knowledge and performing automatic restructuring, wherein the existing meta-knowledge includes ontological entity relations, key phrases, noun-verb pairs and domain lexicons;
providing, by the processor, a data source as input to a knowledge generation module;
extracting, by the processor, one or more features from the data source using the trained information extraction model, wherein the information extraction model is configured to perform stemming, co-reference resolution, chunk parsing and part of speech tagging using at least one of Natural Language Processing pipeline tools, wherein the training module configured to train the information extraction model to perform the steps of:
converting, by the processor, the first input and second input into a structured format, wherein the structured format is annotated data,
extracting one or more features from the annotated data, and
generating patterns based on user annotated documents;
setting, by the processor, a pattern using the generated patterns based on one or more extracted features, wherein the trained information extraction model applies pre-learned and stored features appropriate for information feeds to set the pattern; and
generating, by a knowledge generation module coupled with the processor, the entity relationship model corresponding to the data source based on the set pattern using the knowledge generation module, wherein the entity relationship model is generated by building a relational hierarchy of the one or more features by populating values associated with the one or more features, wherein the generated entity relationship model is further validated using the generated first level of knowledge as a validation rule for a new knowledge.

* * * * *